(12) United States Patent
Ashcroft

(10) Patent No.: US 6,186,564 B1
(45) Date of Patent: Feb. 13, 2001

(54) REMOVABLE VEHICLE SIDE PROTECTOR

(76) Inventor: Timothy N. Ashcroft, 18781 Ambrose La., Huntington Beach, CA (US) 92648

(*) Notice: Under 35 U.S.C. 154(b), the term of this patent shall be extended for 0 days.

(21) Appl. No.: 09/455,995

(22) Filed: Dec. 7, 1999

(51) Int. Cl.7 .................................................. B60R 19/42
(52) U.S. Cl. ........................................... 293/128; 280/770
(58) Field of Search ............................. 293/128; 280/770

(56) References Cited

U.S. PATENT DOCUMENTS

| | | |
|---|---|---|
| 3,738,695 | 6/1973 | McBee . |
| 3,882,574 | 5/1975 | Martinez . |
| 4,498,697 * | 2/1985 | McGlone .............................. 293/128 |
| 4,674,783 | 6/1987 | Hogan, III . |
| 4,708,380 * | 11/1987 | Cruz ...................................... 293/128 |
| 4,726,614 * | 2/1988 | Myers et al. .......................... 293/128 |
| 4,810,013 | 3/1989 | Spears . |
| 4,828,302 | 5/1989 | Marsigan, Jr. . |
| 4,879,543 | 11/1989 | Smith, Sr. . |
| 4,965,103 * | 10/1990 | Roberts et al. ....................... 293/128 |
| 4,969,674 | 11/1990 | Wagner . |
| 5,071,181 | 12/1991 | Wagner . |
| 5,149,166 | 9/1992 | Wille et al. . |
| 5,156,425 | 10/1992 | Wagner . |
| 5,184,857 * | 2/1993 | Hawkins .............................. 293/128 |
| 5,975,599 * | 11/1999 | Goldstein ............................. 293/128 |

* cited by examiner

Primary Examiner—Gary C. Hoge
(74) Attorney, Agent, or Firm—Knobbe, Martens, Olson & Bear, LLP

(57) ABSTRACT

A removable protector for protecting a side of a vehicle from dents and scratches caused by objects coming toward the side of the vehicle. The protector comprises a first strap with a first securement means, a second strap with a second securement means, an elongated member with a hollow passage, and a magnet attached to the elongated member.

24 Claims, 5 Drawing Sheets

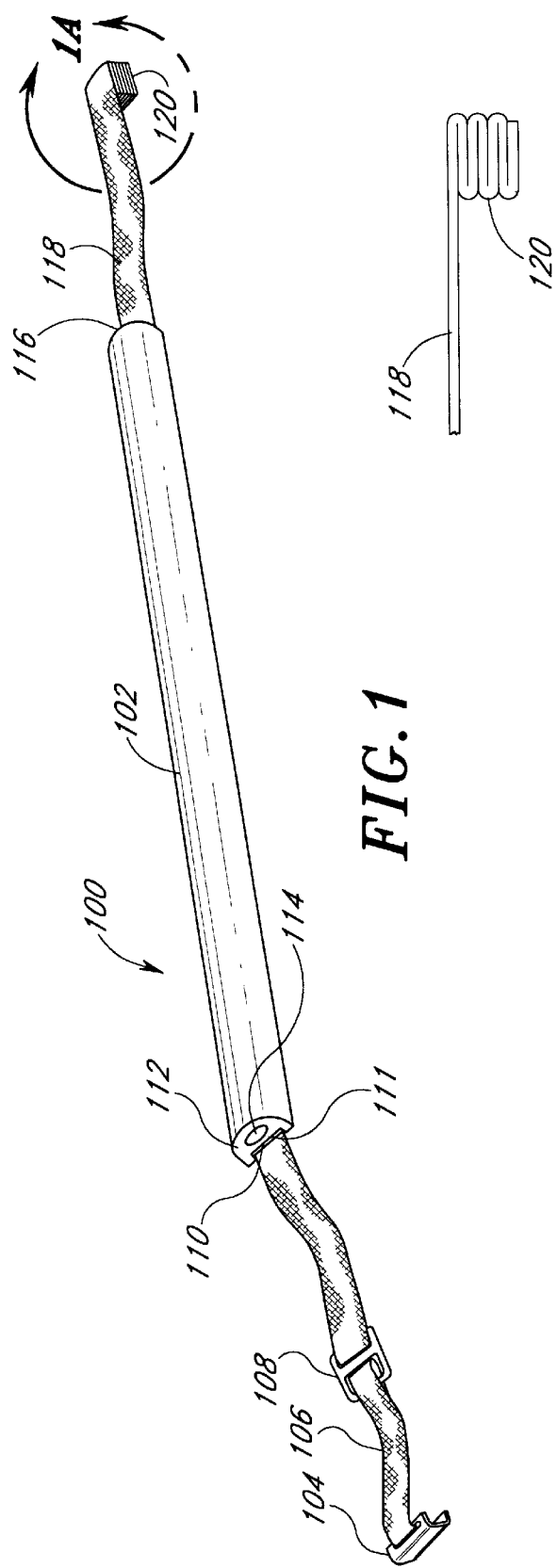

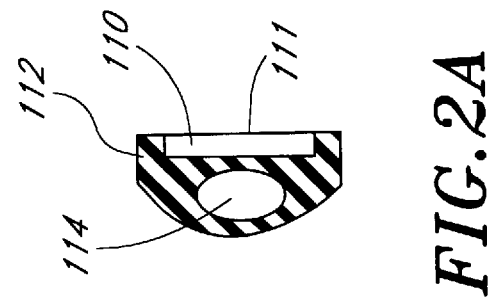
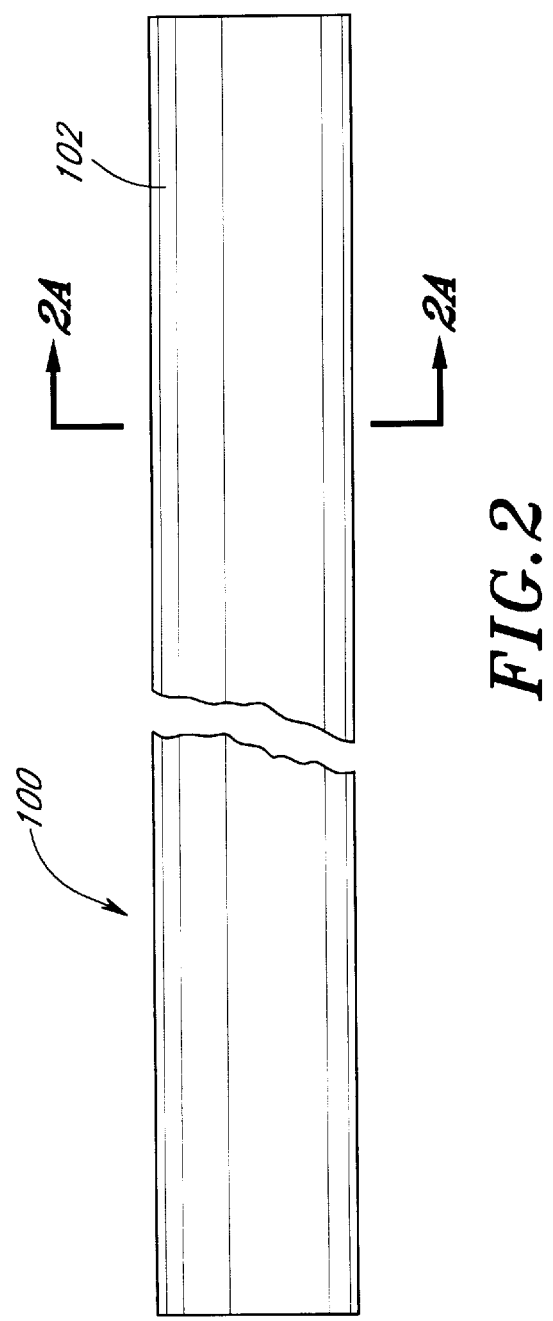

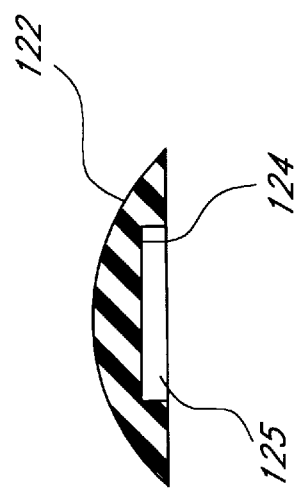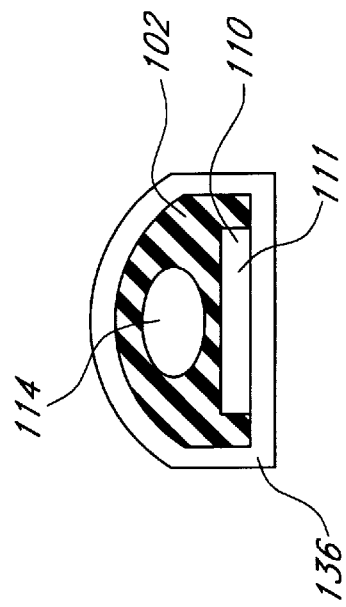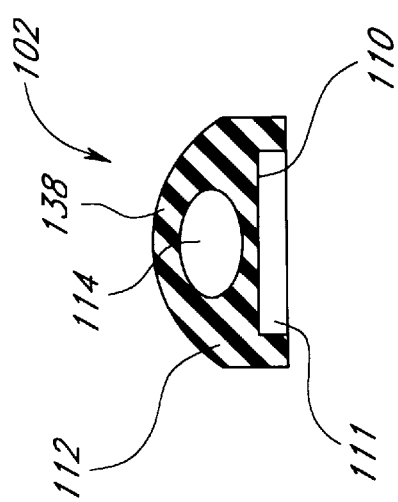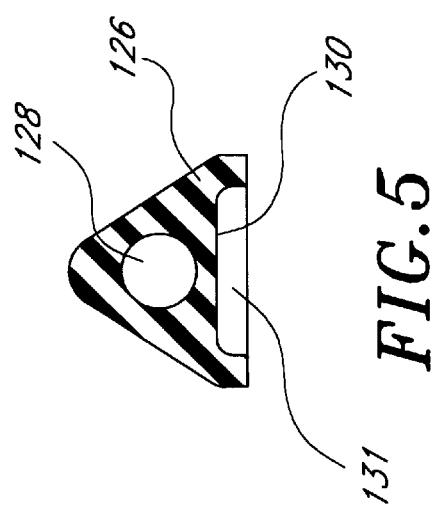

REMOVABLE VEHICLE SIDE PROTECTOR

BACKGROUND OF THE INVENTION

1. Field of the Invention

The present invention relates to a vehicle protector. Specifically, the present invention relates to a removable protector adapted to protect a side of a vehicle from objects coming toward the side of the vehicle.

2. Description of the Related Art

Currently, some motored vehicles have no protection against paint smears, scratches and dents caused by objects impacting the side of a vehicle while a vehicle is parked. These objects include, for example, an opening door of an adjacent vehicle, shopping carts, bicycles, garbage cans, children's toys, etc. Scratches and dents are often difficult and expensive to repair.

Some vehicles have side bumper strips which are permanently affixed to the sides of the vehicle. These permanently-affixed bumper strips only provide limited protection to a narrow section of the vehicle. For example, these permanently-affixed bumper strips often do not protect a vehicle's side from the outermost tip of another vehicle's opening door because the bumper strip is located either above or below the outermost tip of the other vehicle's opening door. Moreover, these permanently-affixed bumper strips are often designed to be very narrow because they are not aesthetically pleasing. Increasing the size of these bumper strips decreases the aesthetic appearance of the vehicle.

Some vehicle protectors are removable. Some of these removable protectors are adapted to be used with vehicles of different sizes or shapes, but the protectors require adjustments or permanent modifications to make the protector fit vehicles with different sizes or shapes. For those protectors that require adjustments, the time it takes to adjust the protector may be burdensome. For those protectors that require permanent modifications, such as cutting the protector down to size, a user may have to purchase a new protector to fit a vehicle with a different size or shape.

SUMMARY OF THE INVENTION

The present invention relates to a removable protector adapted to protect a side of a vehicle from paint smears, dents and scratches caused by objects impacting the side of the vehicle. One embodiment of the protector comprises a first strap with a first securement means, a second strap with a second securement means, an elongated member with a hollow passage, and a magnet attached to the elongated member.

There are several advantages and features of the present invention. In a preferred embodiment, the adaptable nature of the protector advantageously allows the same protector to be used on vehicles of different sizes and shapes without modifying or adjusting the protector. The adaptable nature of the protector also allows the protector to be used in a number of places, such as the lateral sides of a vehicle or the rear side of a vehicle. Some cars have nothing to protect the lateral sides or the rear side from scratches and dents.

In one embodiment, the hollow passage of the elongated member is filled with air or a liquid to help the elongated member absorb the impact of an incoming object.

In one embodiment, the protector is adapted to be firmly secured to a side of a vehicle while the door of the vehicle is closed in order to prevent theft or displacement.

In one embodiment, the protector advantageously protects a vehicle's side from an adjacent vehicle's opening door even where the protector is placed above or below the outermost tip of the adjacent vehicle's opening door. The protector is advantageously lightweight, easy to install, easy to remove and easy to manufacture.

One aspect of the invention relates to a removable protector for protecting an exterior side of a vehicle, where the side of the vehicle has at least one door. The protector comprises a first flexible strap having a first end and a second end. The first end has a first securement means which is adapted to be at least partially inserted within the door of the vehicle. The first securement means is adapted to secure the first strap to the side of the vehicle when the door of the vehicle is closed. The protector further comprises a second flexible strap having a first end and a second end. The second end has a second securement means adapted to be at least partially inserted within the door of the vehicle. The second securement means is adapted to secure the second strap to the side of the vehicle when a door of the vehicle is closed.

The protector further comprises an elongated member attached to the second end of the first strap and the first end of the second strap. The elongated member is adapted to protect the side of the vehicle from an object coming toward the side of the vehicle. The elongated member has a hollow passage which is adapted to absorb the impact of an object coming in contact with the elongated member. The protector further comprises a magnet attached to the elongated member. The magnet is adapted to releasably hold the elongated member along the side of the vehicle.

BRIEF DESCRIPTION OF THE DRAWINGS

FIG. 1 illustrates a protector in accordance with one embodiment of the present invention.

FIGS. 2 and 2A illustrate an elongated member of the protector of FIG. 1.

FIG. 3 is a cross-sectional view of the elongated member of FIG. 1.

FIG. 4 is a cross-sectional view of another embodiment of the elongated member of FIG. 1.

FIG. 5 is a cross-sectional view of another embodiment of the elongated member of FIG. 1.

FIG. 7 is a cross-sectional view of another embodiment of the elongated member of FIG. 1.

DETAILED DESCRIPTION OF THE PREFERRED EMBODIMENT

Figure 6:
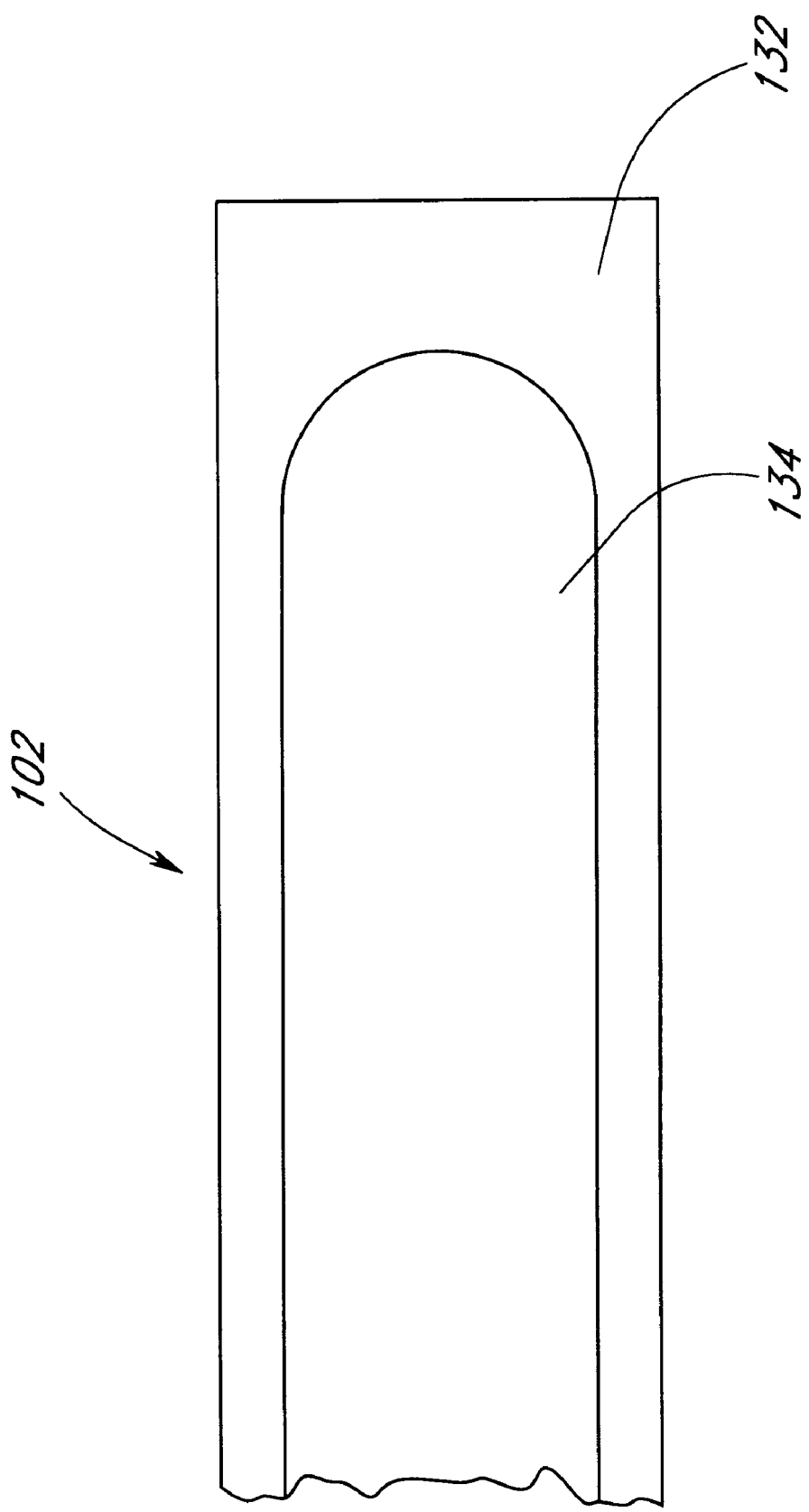
FIG. 6 illustrates an exterior side of one embodiment of the elongated member of FIG. 2.

FIGS. 1–8 illustrate various embodiments of a protector in accordance with the present invention. The components of the protector may be modified in length, width and shape to accommodate the length, width and shape of a particular vehicle and its components. The size and shape of the components of the protector may also be modified according to the degree of protection desired by a user.

FIG. 1 illustrates a protector 100 in accordance with one embodiment of the present invention. The protector 100 comprises an elongated member 102, a hook or clip 104, a first flexible strap 106, a buckle 108, a magnet 111, a second flexible strap 118 and an enlarged end 120. In FIG. 1, the elongated member 102 has a first end 112, a second end 116, a hollow passage 114 and a cavity (groove or channel) 110. The first and second straps 106, 118 are glued, bonded or otherwise attached to the cavity 110 of the elongated member 102 during manufacture. The clip 104 is glued, bonded or otherwise attached to the first strap 106. The cavity 110 provides a space for a magnet 111 to be glued, bonded or otherwise attached to the elongated member 102.

In FIG. 1, the flexible straps 106, 118 are preferably constructed with ballistic nylon. Alternatively, in other embodiments, the straps 106, 118 may be constructed with other substantially durable and flexible materials. The straps 106, 118 allow the same protector 100 to be used on vehicles with different door sizes. At least the bottom of the straps 106, 118 are preferably smoothed, molded, coated with a substance or attached to a material that prevents the straps 106, 118 from scratching the surface of the vehicle.

In FIG. 1, in one embodiment, the magnet 111 comprises a permanent bar magnet. The magnet 111 is preferably a single, integrated piece. Alternatively, the magnet 111 is a plurality of individual pieces. The magnet 111 preferably comprises a flexible material with pieces of a magnetic material dispersed within the flexible material. For example, in one embodiment, the magnet 111 comprises a rubber or plastic with pieces of magnetic material dispersed within the rubber or plastic. A flexible magnet prevents scratching or damage to the surface of the vehicle while the elongated member 102 is in place along the side of the vehicle. In one embodiment, the cavity 110 receives the magnet 111 such that the magnet 111 does not touch the surface of the vehicle when the elongated member 102 is placed along the side of the vehicle. A flexible magnet may further absorb the impact of an object striking the elongated member 102. In addition, a flexible magnet allows the elongated member 102 to conform to the shape of the vehicle side.

In a preferred embodiment, the magnetic force of the magnet 111 is sufficiently strong to releasably hold the elongated member 102 in place after the protector is placed on the side of a vehicle. The magnet 111 may be attracted to the metal of a vehicle's exterior panel or internal components within the vehicle's door. At least the bottom of the magnet 111 is preferably smoothed, molded, coated with a substance or attached to a material that prevents the magnet 111 from scratching the surface of the vehicle.

In FIG. 1, the hollow passage 114 and the cavity 110 of the elongated member 102 may be molded, cut, drilled, or otherwise formed in the elongated member 102. In one embodiment, the ends of the hollow passage 114 are closed to form one or more pockets which are filled with air or a liquid during manufacture. The hollow passage 114 and the air or liquid are adapted to absorb the impact of an object striking the elongated member 102. Alternatively, the ends of the passage 114 are open for air to pass through the passage 114. Alternatively, the hollow passage 114 may be used to hold a magnet in addition to or instead of the magnet 111.

In FIG. 1, the clip 104 may be constructed of metal, plastic or any other suitable material of sufficient compliance to enable the clip 104 to releasably hold the protector 100 in a particular position along the side of a vehicle when a door of the vehicle is closed. The clip 104 is preferably coated with a substance or attached to a material which prevents the clip 104 from scratching the surface of the vehicle's door when the clip 104 is attached to the door. In other embodiments, the size and shape of the clip 104 may be modified to accommodate the size and shape of a particular vehicle's door and door frame. In one embodiment, the clip 104 is removable from the first strap 106, such that a user may attach a clip of another size or configuration or not use a clip at all.

In FIG. 1, the buckle 108 is made of plastic, rubber, metal or any other suitably durable material. In one embodiment, the enlarged end 120 is a triple-folded and stitched section of the second strap 118. In another embodiment, the enlarged end 120 is a rectangular member constructed of plastic, rubber, metal or any other suitably durable material.

FIGS. 2 and 2A illustrate the elongated member 102 of the protector 100 of FIG. 1. FIG. 3 is a cross-sectional view of the elongated member 102 of FIG. 2. As shown in FIG. 3, the elongated member 102 comprises an exterior surface 138, which is substantially smooth and curved to absorb the impact of moving objects and to preserve the shape of the elongated member 102 after one or more impacts.

FIG. 4 is a cross-sectional view of another embodiment of the elongated member 102 of FIG. 1. In FIG. 4, the elongated member 122 comprises a cavity 124 and a magnet 125. The structure and functions of the cavity 124 and the magnet 125 are substantially similar to the structure and the functions of the cavity 110 and the magnet 111 described above with reference to FIG. 1. The elongated member 122 of FIG. 4 does not have a hollow passage, in contrast to the elongated member 122 shown in FIG. 3.

FIG. 5 is a cross-sectional view of another embodiment of the elongated member 102 of FIG. 1. In FIG. 5, the elongated member 126 comprises a substantially triangular-shaped configuration, a hollow passage 128, a cavity 130 and a magnet 131. The structure and functions of the hollow passage 128, the cavity 130 and the magnet 131 are substantially similar to the structure and the functions of the hollow passage 114, the cavity 110 and the magnet 111 described above with reference to FIG. 1. The enlarged height of the elongated member 126 may provide greater protection from an opening door of an adjacent vehicle.

In FIGS. 1–5, the elongated member 102 comprises rubber, styrofoam, plastic, cork, fiberglass or any other material which is substantially resilient and preferably slightly elastic or compliant to absorb the impact of an object striking the side of the vehicle without substantially damaging the elongated member 102. More preferably, the elongated member 102 comprises a material that is adapted to absorb a plurality of impacts of one or more objects striking the elongated member 102 over time. In one embodiment, the elongated member 102 comprises a flexible material that substantially conforms to the shape or contour of the side of the vehicle. The elongated member 102 preferably comprise a single, integrated piece of material. Alternatively, the elongated member comprises a plurality of one or more pieces or one or more materials.

In one embodiment, the elongated member 102 is shaped to accommodate an exterior surface of a vehicle when the protector 100 is installed on the side of the vehicle. Specifically, the magnet 111 and the bottom surface of the elongated member 102 (as shown in FIG. 3) are substantially flat or slightly curved to accommodate a substantially flat or slightly curved exterior surface of a vehicle when the protector 100 is installed on the side of the vehicle. Alternatively, in another embodiment, the elongated member 102 comprises a limited compliance material which conforms to the exterior surface of a vehicle when the protector 100 is installed on the side of the vehicle. In one embodiment, the elongated member 102 comprises a material that is lightweight. In one embodiment, the elongated member 102 comprises a material that is waterproof.

In one embodiment, the horizontal protrusion of one of the elongated members 102, 126 from the outer surface of a vehicle's side (i.e., the height of the elongated members 102, 126 in FIGS. 3 and 5) is sufficiently thick to prevent the tip or edge of an adjacent vehicle's opening door from striking an unprotected region of the first vehicle's side, particularly where the outermost tip of the adjacent vehicle's opening door is above or below one of the elongated members 102, 126.

FIG. 6 illustrates an exterior side 132 of one embodiment of the elongated member 102 of FIG. 2. The exterior side 132 may be painted, molded, embossed, engraved, silk-screened, labeled or otherwise marked with words or a logo which indicates the manufacturer of the protector 100 or the manufacturer of the vehicle.

FIG. 7 is a cross-sectional view of another embodiment of the elongated member 102 of FIG. 2. In FIG. 7, the elongated member 102 of FIG. 3 is enclosed in a sheath 136 which preferably comprises the same material as the straps 106, 118. In one embodiment, the sheath 136 is made of ballistic nylon and stitched to enclose the elongated member 102. Alternatively, in other embodiments, the sheath 136 comprises another substantially durable and flexible material. In one embodiment, the sheath 136 is waterproof. At least one side of the sheath 136 is preferably smoothed, molded, coated with a substance or attached to a material that prevents the sheath 136 from scratching the surface of the vehicle.

The use and operation of the protector 100 is described with reference to FIGS. 1–7. A user opens a door on one side of a vehicle and attaches the elongated member 102 of FIG. 1 to the exterior surface of the door. The door may be located on any side of a vehicle, such as one of the lateral sides or the rear side. The magnet 111, shown in FIG. 1, releasably holds the elongated member 102 in a particular place (e.g., height) on the side of the vehicle selected by the user. The position on the side of the vehicle selected by the user preferably maximizes the protection of the vehicle from dents and scratches caused by objects such as an opening door of an adjacent vehicle, shopping carts, bicycles, garbage cans, children's toys, etc. The position selected by a user may vary depending on the type of vehicle, the location of the vehicle, the time of day and the likelihood of certain objects striking the vehicle.

After the user places the elongated member 102 on the side of the vehicle door, the user places or fastens the clip 104 on a vertical edge of the vehicle door. The elongated member 102 may be aligned such that the clip 104 is proximate to a rear vertical edge of the vehicle side door ('vertical edge' as used herein includes edges which are slanted or curved). Alternatively, the elongated member 102 may be aligned such that the clip 104 is proximate to a front vertical edge of the vehicle door. Alternatively, instead of fastening the clip 104 to a vertical edge, the user places the clip 104 on a structure on an interior portion of the door.

The user may adjust the length of the first strap 106 by using the buckle 108 until the clip 104 and the elongated member 102 are securely fastened along the side of the vehicle. The excess portion of the first strap 106, if any, may be tucked inside a door cavity of the vehicle or inside the vehicle itself. Similarly, the user tucks the second strap 118 and the enlarged end 120 inside a door cavity of the vehicle or inside the vehicle itself. The user then closes the door of the vehicle with the protector 100 in place.

The enlarged end 120 of the second strap 118 is preferably too large to fall out of the gap between the vertical edge of the vehicle door and the proximate edge of the vehicle side when the vehicle door is closed. Thus, the enlarged end 120 prevents the second strap 118 from falling out of the closed vehicle door. Similarly, when the door is closed, the clip 104 is held firmly in place by the vertical edge of the vehicle door and the edge of the vehicle side. Thus, the enlarged end 120 and the clip 104 prevent the protector 100 from falling off the vehicle. For example, if the user forgets to remove the protector 100 from the passenger side of the vehicle and drives off, the protector 100 will not come loose and fall off the vehicle.

The clip 104 and the enlarged end 120 also prevent theft of the protector 100 when the door of the vehicle is closed. In one embodiment, the magnet 111 provides a primary securement means, and the clip 104 and the enlarged end 120 provides a secondary securement means.

To remove the protector, the user opens the vehicle door, releases the second strap 118 and removes the elongated member 102 and the clip 104 from the vehicle door.

The flexible straps 106, 118 allow the protector 100 to be used on a large number of vehicles with doors of different sizes or shapes. For example, the protector 100 may be used on a vehicle which has a door that is longer horizontally than the elongated member 102. When the protector 100 is placed on the vehicle's door and the door is closed, any excess portion of the protector 100 protrudes from one or both vertical edges of the vehicle's door. The excess portions of the straps 106, 118 may be tucked into the vehicle or left hanging outside of the vehicle. Thus, the same sized protector 100 can be used with vehicles which have doors that are shorter or longer than the elongated member 102.

More than one protectors 100 may be placed at different heights and/or angles along the same side of a vehicle to increase the zone of protection. For example, if a user parks a vehicle along a street where children are playing street hockey or performing skateboarding stunts, the user may choose to use two or more protectors 100.

The protector 100 may also be placed on the rear side of a vehicle to protect the rear side from dents and scratches. The method of installing the protector 100 to the rear side of a vehicle is substantially similar to the method of installing the protector 100 to a lateral side of the vehicle. The user opens a rear door of the vehicle, such as a trunk, a passenger door or a cargo door, fastens the clip 104, inserts the second strap 118, and closes the door.

Figure 8:
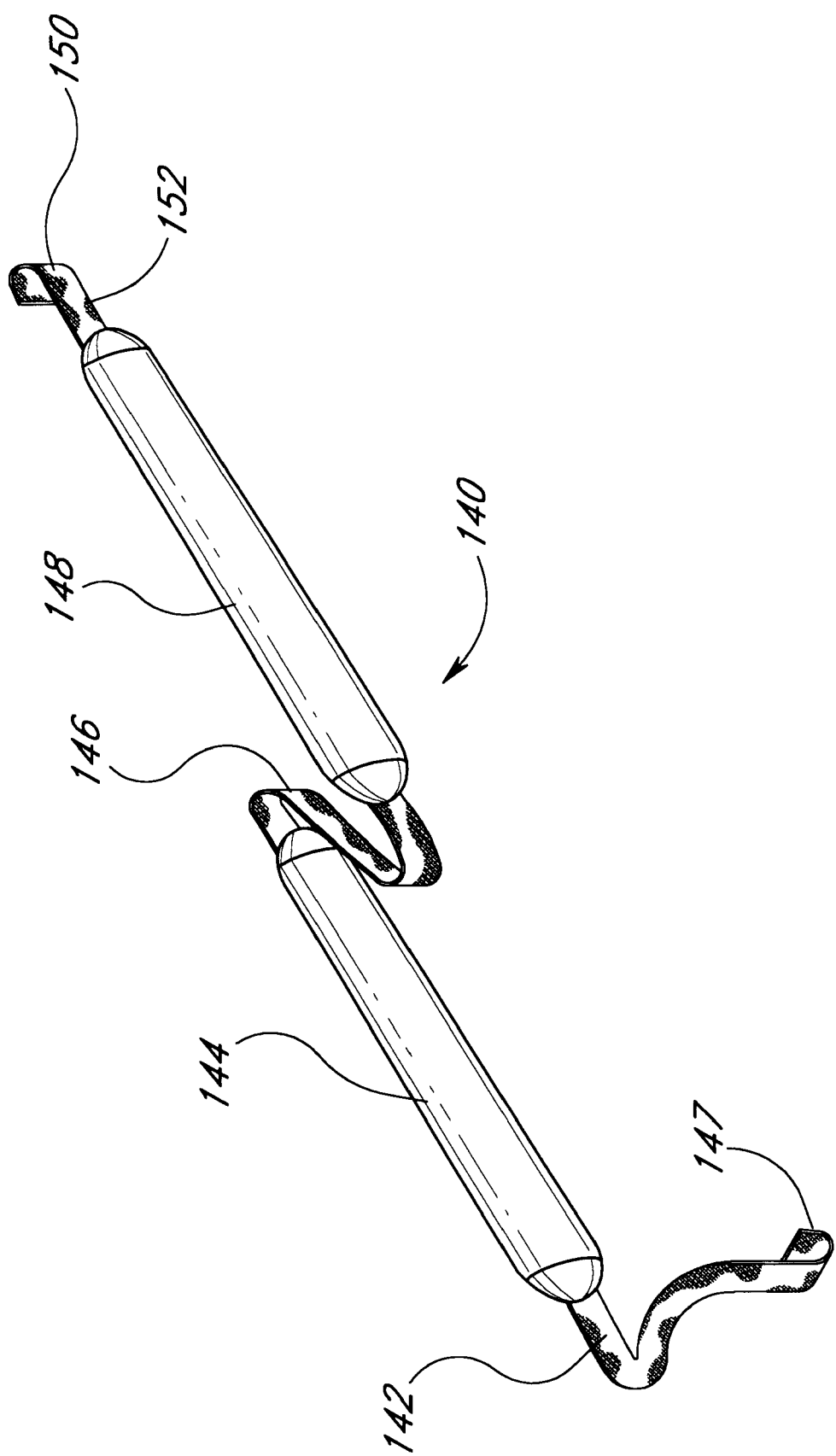
FIG. 8 illustrates a protector in accordance with another embodiment of the present invention.

FIG. 8 illustrates a protector 140 in accordance with another embodiment of the present invention. In FIG. 8, a protector 140 comprises a first clip 141, a first strap 142, a first elongated member 144, an interconnecting strap 146, a second elongated member 148, a second strap 152, and a second clip 150. In FIG. 8, the first and the second elongated members 144, 148 are substantially similar in structure and function to the elongated member 102 described above with reference to FIGS. 1–7. In alternative embodiments, one or more of the clips 141, 150 may be replaced with enlarged ends, such as the enlarged end 120 shown in FIG. 1.

The protector 140 of FIG. 8 may be advantageously used for a vehicle with two or more doors which are adjacent to each other. For example, the first elongated member 144 may be placed on a first door, and the second elongated member 148 may be placed on a second door. The use and operation of the protector 140 in FIG. 8 is substantially similar to the use and operation of the protector 100 described above with reference to FIGS. 1–7.

The invention may be embodied in other specific forms without departing from its spirit or essential characteristics. For example, in one embodiment, the protector 100 of FIG. 1 does not include a buckle 108. In one embodiment, the protector 100 of FIG. 1 has another clip, such as the clip 104 shown in FIG. 1, at the end of the second strap 118 instead of an enlarged end 120.

In one embodiment, both the first and second straps 106, 118 have enlarged ends, similar to the enlarged end 120 shown in FIG. 1, instead of clips. In this embodiment with two enlarged ends, the protector may be easier to use on vehicles in which the elongated body 102 (FIG. 1) is longer than the vehicle's door. In this embodiment with two enlarged ends, when the protector is placed on the vehicle's door and the door is closed, any excess portion of the protector protrudes from one or both vertical edges of a vehicle's door. Thus, the same sized protector can be used with vehicles which have doors that are shorter or longer than the elongated member 102.

In FIGS. 1–8, the height, width, length and shape of the elongated members 102, 122, 126 may be modified during manufacture to offer more or less protection for a vehicle.

The embodiments described above are to be considered in all respects only as illustrative and not restrictive. Thus, the scope of the invention is indicated by the appended claims rather than the foregoing description. All changes which come within the meaning and range of equivalency of the claims are to be embraced within their scope.

What is claimed is:

1. A removable protector for protecting an exterior side of a vehicle, the side of the vehicle having at least one door, the protector comprising:
   a first flexible strap having a first end and a second end, the first end having a first securement means adapted to be at least partially inserted within the door of the vehicle, the first securement means being adapted to secure the first strap to the side of the vehicle when the door of the vehicle is closed;
   a second flexible strap having a first end and a second end, the second end having a second securement means adapted to be at least partially inserted within the door of the vehicle, the second securement means being adapted to secure the second strap to the side of the vehicle when a door of the vehicle is closed;
   an elongated member attached to the second end of the first strap and the first end of the second strap, the elongated member being adapted to protect the side of the vehicle from an object coming toward the side of the vehicle; and
   a magnet attached to the elongated member, the magnet adapted to releasably hold the elongated member along the side of the vehicle.

2. The protector of claim 1, wherein the elongated member is a single, integrated piece.

3. The protector of claim 1, wherein the magnet is a single, integrated piece.

4. The protector of claim 1, wherein the magnet comprises a flexible material with pieces of a magnetic material dispersed within the flexible material.

5. The protector of claim 1, wherein the elongated member is made of rubber.

6. The protector of claim 1, wherein the elongated member is made of plastic.

7. The protector of claim 1, wherein the elongated member is made of styrofoam.

8. The protector of claim 1, further comprising a hollow passage adapted to absorb the impact of an object coming in contact with the elongated member, wherein the hollow passage comprises an enclosed pocket of air.

9. The protector of claim 1, further comprising a hollow passage adapted to absorb the impact of an object coming in contact with the elongated member, wherein the hollow passage comprises an enclosed pocket of liquid.

10. The protector of claim 1, wherein the first securement means is a clip, the clip being adapted to engage a vertical edge of the door of the vehicle.

11. The protector of claim 10, wherein the clip is removable.

12. The protector of claim 1, wherein the first securement means is a segment of the first strap, the segment being folded and stitched.

13. The protector of claim 1, wherein the second securement means is a clip, the clip being adapted to engage a vertical edge of a door of the vehicle.

14. The protector of claim 13, wherein the clip is removable.

15. The protector of claim 1, wherein the second securement means is a segment of the first strap, the segment being folded and stitched.

16. The protector of claim 1, wherein the side is a lateral side of the vehicle, the lateral side extending from a front portion of the vehicle to a rear portion of the vehicle.

17. The protector of claim 1, wherein the side is a rear side of the vehicle.

18. The protector of claim 1, wherein the straps are made of ballistic nylon.

19. The protector of claim 1, further comprising a sheath around the elongated member.

20. The protector of claim 19, wherein the sheath is made of ballistic nylon.

21. A removable protector for protecting an exterior side of a vehicle, the side of the vehicle having at least one door, the protector comprising:
   an elongated member adapted to protect the side of the vehicle from an object coming toward the side of the vehicle, the elongated member having a hollow passage which is adapted to absorb the impact of an object coming in contact with the elongated member;
   a magnet attached to the elongated member, the magnet adapted to releasably hold the elongated member along the side of the vehicle, and
   a pair of straps, one of which extends from one end of said elongated member and the other of which extends from the other end of said elongated member, said straps adapted to be at least partially inserted between edges of doors of said vehicle and the body of said vehicle to secure said elongated member to said vehicle.

22. A removable protector for protecting an exterior side of a vehicle, the side of the vehicle having at least one door, the protector comprising:
   an elongated member adapted to protect the side of the vehicle from an object coming toward the side of the vehicle, the elongated member having a cavity;
   a magnet attached within the cavity of the elongated member, the magnet adapted to releasably hold the elongated member along the side of the vehicle, and
   a pair of straps, one of which extends from one end of said elongated member and the other of which extends from the other end of said elongated member, said straps adapted to be at least partially inserted between edges of doors of said vehicle and the body of said vehicle to secure said elongated member to said vehicle.

23. The protector of claim 22, wherein the cavity receives the magnet such that the magnet does not touch the surface of the vehicle when the elongated member is placed along the side of the vehicle.

24. The protector of claim 22, further comprising first and second securement means each connected to one of said pair of straps and adapted to be at least partially inserted between one of said edges of said doors and said vehicle.

* * * * *